United States Patent
Coin

(10) Patent No.: US 9,422,940 B2
(45) Date of Patent: Aug. 23, 2016

(54) SENSORLESS CONTROL METHOD FOR A MULTIPUMP SYSTEM

(71) Applicant: Schneider Toshiba Inverter Europe SAS, Pacy sur Eure (FR)

(72) Inventor: Sylvain Coin, Bretagnolles (FR)

(73) Assignee: SCHNEIDER TOSHIBA INVERTER EUROPE SAS, Pacy sur Eure (FR)

( * ) Notice: Subject to any disclaimer, the term of this patent is extended or adjusted under 35 U.S.C. 154(b) by 282 days.

(21) Appl. No.: 14/083,914

(22) Filed: Nov. 19, 2013

(65) Prior Publication Data
US 2014/0169984 A1 Jun. 19, 2014

(30) Foreign Application Priority Data
Dec. 17, 2012 (FR) ..................................... 12 62147

(51) Int. Cl.
*F04B 49/06* (2006.01)
*F04D 15/00* (2006.01)
(Continued)

(52) U.S. Cl.
CPC .......... *F04D 15/0066* (2013.01); *F04B 49/065* (2013.01); *F04D 13/12* (2013.01); *F04D 15/0088* (2013.01); *G01F 1/34* (2013.01);
(Continued)

(58) Field of Classification Search
CPC ..... F04D 13/12; F04D 13/14; F04D 15/0066; F04D 15/0088; F04B 49/06; F04B 49/065; F04B 2205/09; F05D 2270/71; F05D 2270/304; F05D 2270/335
See application file for complete search history.

(56) References Cited

U.S. PATENT DOCUMENTS

| | | |
|---|---|---|
| 2004/0062657 A1 | 4/2004 | Beck et al. |
| 2004/0062658 A1 | 4/2004 | Beck et al. |

(Continued)

FOREIGN PATENT DOCUMENTS

| | | | | |
|---|---|---|---|---|
| JP | 2001-342966 | 12/2001 | | |
| JP | 2004-124814 | 4/2004 | | |
| JP | 2004124814 | * 4/2004 | .............. | F04D 15/00 |
| JP | 2006-307682 | 11/2006 | | |

OTHER PUBLICATIONS

French Preliminary Search Report issued Aug. 22, 2013, in French Application No. 12 62147 filed Dec. 17, 2012 (with Written Opinion and English Translation of Categories of Cited Documents).

*Primary Examiner* — Charles Freay
*Assistant Examiner* — Philip Stimpert
(74) *Attorney, Agent, or Firm* — Oblon, McClelland, Maier & Neustadt, L.L.P.

(57) ABSTRACT

The invention relates to a control method implemented in a processing unit (UC) used in the control of a multipump system, said multipump system comprising an inlet passage (IN) intended to receive a fluid, two pumps ($P_1$, $P_2$) connected in parallel to said inlet passage and an outlet passage connected to the outlets of the two pumps ($P_1$, $P_2$), at least one of the two pumps being controlled by a variable speed drive (VSD), each pump ($P_1$, $P_2$) being defined by a first characteristic curve ($HQ_{curve\_n}$), flow rate-manometric head at maximum speed, and by a second characteristic curve ($PQ_{curve\_n}$), flow rate-received power. The control method provides for determining the total flow rate ($Q_{total}$) of the multipump system without using sensors such as flowmeters.

4 Claims, 1 Drawing Sheet

(51) Int. Cl.
*F04D 13/12* (2006.01)
*G01F 1/34* (2006.01)

(52) U.S. Cl.
CPC ....... *F04B2205/09* (2013.01); *F05D 2270/304* (2013.01); *F05D 2270/335* (2013.01); *F05D 2270/71* (2013.01)

(56) References Cited

U.S. PATENT DOCUMENTS

| | | |
|---|---|---|
| 2004/0064292 A1 | 4/2004 | Beck et al. |
| 2006/0251525 A1 | 11/2006 | Beck et al. |
| 2006/0276999 A1* | 12/2006 | Beck .................. E21B 43/126 702/182 |

* cited by examiner

SENSORLESS CONTROL METHOD FOR A MULTIPUMP SYSTEM

TECHNICAL FIELD OF THE INVENTION

The present invention relates to a control method for a multipump system.

1. Prior Art

A multipump system includes at least two pumps, at least one of these two pumps being of variable speed, controlled in speed by a variable speed drive, and the other being of fixed speed or variable speed. In the multipump system, the two pumps are connected in parallel to the same inlet passage and their outlets meet at a common outlet passage.

Certain solutions for controlling a multipump system require a measurement of the total flow rate on the outlet passage. To measure this flow rate, the current solutions use a flowmeter or use methods that are not very satisfactory. This is the case in particular as regards patents JP2004-124814 and JP2006-307682. A need therefore exists today to be able to estimate in a simple manner, with minimal installation, the total flow rate of a fluid flowing in the outlet passage of a multipump system.

The aim of the invention is therefore to propose a control method implemented in a processing unit, providing for the capability of determining the total flow rate of a fluid flowing through the outlet passage, without the use of a flowmeter, this method being simple to implement and requiring only a minimum number of sensors.

2. Description of the Invention

This aim is achieved by a control method implemented in a processing unit used in the control of a multipump system, said multipump system comprising an inlet passage intended to receive a fluid, two pumps connected in parallel to said inlet passage and an outlet passage connected to the outlets of the two pumps, at least one of the two pumps being controlled by a variable speed drive, each pump being defined by a first characteristic curve, flow rate-manometric head at maximum speed, and by a second characteristic curve, flow rate-received power, the control method including the following steps:

- determination of the flow rate of the pump controlled by the variable speed drive from the second characteristic curve, from an estimated speed of said pump and from the power supplied to said pump by the variable speed drive,
- determination of the manometric head of said pump controlled by the variable speed drive from the determined flow rate and from the first characteristic curve of said pump,
- determination of the flow rate of each pump of the multipump system from the determined manometric head, from the speed of each pump and from the first characteristic curve,
- determination of the total flow rate of the multipump system by addition of the flow rates obtained for each pump.

According to a particular feature, the speed of the pump controlled by the variable speed drive is determined from the speed reference injected into a control loop or from a speed measurement.

The invention relates also to a variable speed drive including a processing unit arranged to implement the control method as defined above.

BRIEF DESCRIPTION OF THE DRAWINGS

Other features and advantages will become clear in the following detailed description, given with reference to the appended drawings listed below.

DETAILED DESCRIPTION OF AT LEAST ONE EMBODIMENT

Figure 1:
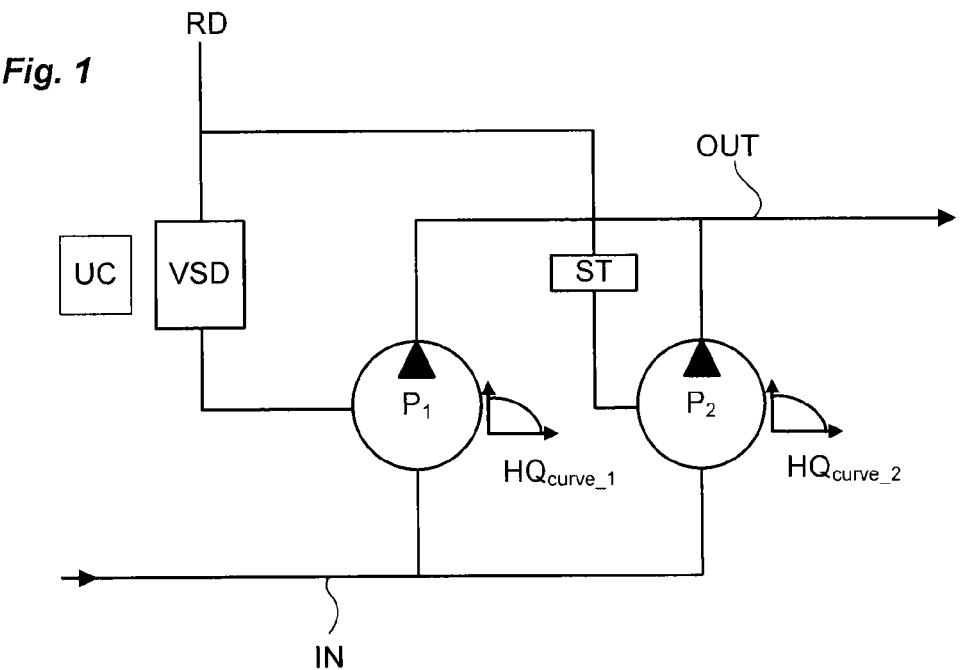
FIG. 1 represents a multipump system, one of the pumps being controlled by a variable speed drive, FIG. 2 schematically illustrates the principle of operation of the control method of the invention.

With reference to FIG. 1, a multipump system includes at least two pumps $P_1$, $P_2$ connected in parallel. Each pump is for example of the centrifugal type and is intended to suck in a fluid via an inlet and to deliver it via an outlet. A pump can be of variable speed ($P_1$), controlled by a variable speed drive VSD, or of fixed speed ($P_2$) controlled by a simple starter ST. In a multipump system, at least one of the two pumps is of variable speed, while the other can be of variable speed or of fixed speed.

Hereafter in the description, a multipump system with only two pumps $P_1$, $P_2$ (denoted in a general way by $P_n$) will be considered. Of course, the invention can absolutely be applied to a system including more than two pumps.

In the multipump system, the two pumps $P_1$, $P_2$ used are connected in parallel. They are powered via an electrical distribution network RD. Thus, the system includes a common inlet passage IN joining the inlets of the two pumps $P_1$, $P_2$ and a common outlet passage OUT joining the outlets of the two pumps $P_1$, $P_2$. The pump $P_1$ is controlled by a variable speed drive VSD.

Furthermore, in a known way, each pump $P_1$, $P_2$ is defined by a first pump characteristic curve ($HQ_{curve\_1}$, $HQ_{curve\_2}$ denoted in a general way by $HQ_{curve\_n}$). This curve illustrates the existing relationship between the manometric head H of the pump and its volumetric flow rate Q at maximum speed. The manometric head H of the pump is expressed in meters while the volumetric flow rate Q is expressed for example in m$^3$/hour. Each pump is also defined by a second pump characteristic curve ($PQ_{curve\_1}$, $PQ_{curve\_2}$ denoted in a general way by $PQ_{curve\_n}$) expressing the relationship between the power supplied to the motor of the pump and the flow rate $Q_{Pn}$ at the outlet of the pump at maximum speed.

The control method of the invention is implemented in a processing unit UC. This processing unit UC is for example included in the variable speed drive VSD used for controlling one or several pumps of the multipump system.

The control method of the invention exhibits the particular feature of operating without any sensor.

Figure 2:
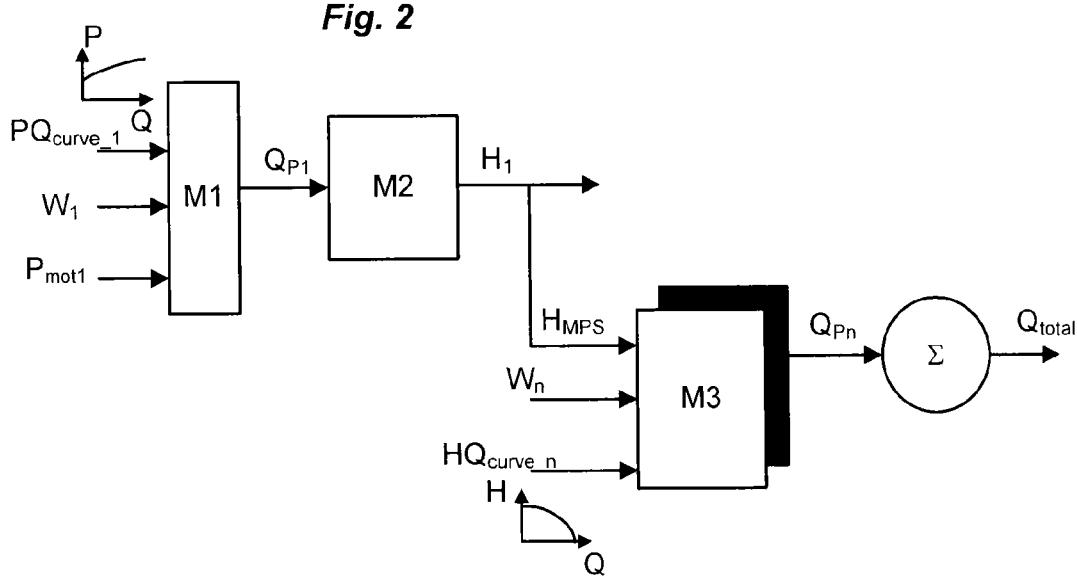

FIG. 2 illustrates the principle of operation of the invention. The processing unit UC starts up a first software module M1 which provides for estimating the flow rate of the pump $P_1$ controlled by the variable speed drive VSD. To this end, the first software module M1 receives as input:

- the speed $W_1$ of the pump $P_1$ controlled by the variable speed drive VSD, this speed being able to be estimated from the speed reference injected into the control loop of the variable speed drive or measured with the aid of a sensor,
- the power $P_{mot1}$ supplied to the pump $P_1$ controlled by the variable speed drive, this power being estimated from the data of the variable speed drive VSD,
- the second characteristic curve $PQ_{curve\_1}$ of the pump $P_1$ in question, which will be extrapolated to the speed $W_1$ of the pump $P_1$, using the affinity laws for centrifugal pumps.

Once the flow rate $Q_{P1}$ at the outlet of the pump $P_1$ is determined, the processing unit UC starts up a second software module M2 which provides for determining the manometric head $H_1$ associated with this flow rate. To this end, the second software module M2 relies on the first characteristic curve $HQ_{curve\_1}$ of the pump $P_1$.

At the point of operation in question, the manometric head $H_{MPS}$ of the multipump system is identical for all the pumps $P_n$, whether they be of fixed speed or variable speed. Consequently, the determined manometric head $H_1$ corresponds to the manometric head $H_{MPS}$ of the multipump system.

Once the manometric head $H_{MPS}$ is determined, the processing unit UC starts up, for each pump $P_n$, a third software module M3 which provides for determining the flow rate $Q_{Pn}$ at the outlet of the pump. This module M3 receives as input the following values:

the determined manometric head $H_{MPS}$ value, a value of the speed $W_n$ of the pump in question in the multipump system, the characteristic curve of flow rate/manometric head ($HQ_{curve\_n}$) of the pump for which the flow rate is sought, which will be extrapolated to the speed $W_n$ of the pump, using the affinity laws for centrifugal pumps.

The speed $W_n$ of the pump can come from different sources. For a variable speed pump, this speed can be based on the speed reference applied at the input of the control loop of the variable speed drive or based on a speed measurement. For a fixed speed pump, it is simply a case of taking into account the operating dynamics of the pump.

Once the processing unit UC has determined the flow rate $Q_{Pn}$ of the fluid at the outlet of each pump, the only remaining task for it is to add these flow rates to obtain the total flow rate $Q_{total}$.

The invention claimed is:

1. A control method implemented in a processor used to control a multipump system, said multipump system comprising an inlet passage configured to receive a fluid, two pumps connected in parallel to said inlet passage and an outlet passage connected to respective outlets of the two pumps a first pump of the two pumps being controlled by a variable speed drive, each of the two pumps being associated with a respective first characteristic curve representing a flow rate versus a manometric head at a maximum speed of the corresponding pump, and being associated with a respective second characteristic curve representing the flow rate versus a received power of the corresponding pump, the control method comprising:

determining a first flow rate of said first pump using the corresponding second characteristic curve, an estimated speed of said first pump, and a power supplied to said first pump by the variable speed drive;

determining a manometric head of said first pump using the determined first flow rate and the first characteristic curve of said first pump;

determining a plurality of flow rates corresponding to the respective pumps of the multipump system, each flow rate of the plurality of flow rates being determined using the determined manometric head of said first pump, a speed of the respective pump, and the corresponding first characteristic curve of the respective pump; and determining a total flow rate of the multipump system by summing the plurality of flow rates corresponding to the respective pumps of the multipump system.

2. The method according to claim 1, further comprising:

determining the speed of the first pump using one of a speed reference injected into a control loop and a speed measurement.

3. A multipump system comprising:

an inlet passage that receives a fluid;

two pumps connected in parallel to said inlet passage, each pump being associated with a respective first characteristic curve representing, for the corresponding pump, a manometric head at a maximum speed versus a flow rate and with a respective second characteristic curve representing, for the corresponding pump, a received power versus the flow rate;

an outlet passage connected to respective outlets of the two pumps;

a variable speed drive configured to control a first pump of the two pumps; and processing circuitry configured to determine a flow rate of said first pump using the second characteristic curve corresponding to the first pump, an estimated speed of said first pump, and a power supplied to said first pump by the variable speed drive, determine a manometric head of said first pump using the determined flow rate of first pump and the first characteristic curve corresponding to said first pump, determine a plurality of flow rates corresponding to the respective pumps of the multipump system, each flow rate of the plurality of flow rates being determined using the determined manometric head of said first pump, a speed of the respective pump, and the corresponding first characteristic curve of the respective pump, and determine a total flow rate of the multipump system by summing the plurality of flow rates corresponding to the respective pumps of the multipump system.

4. The multipump system according to claim 3, wherein the processing circuitry is further configured to determine the speed of the first pump using one of a speed reference injected into a control loop and a speed measurement.

* * * * *